I. P. SMITH.
MEASURING MACHINE.
APPLICATION FILED MAY 12, 1917.

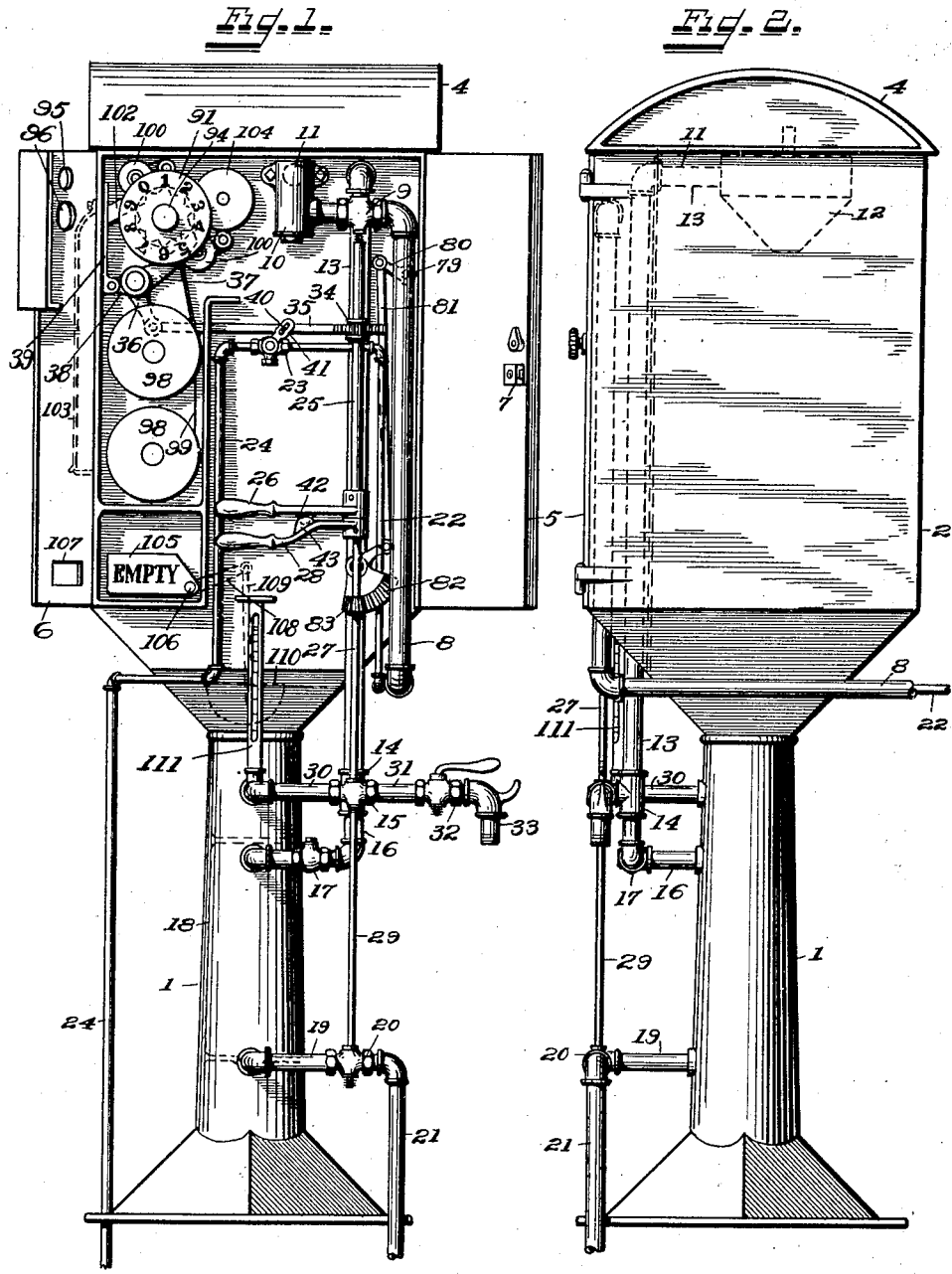

1,330,918.

Patented Feb. 17, 1920.
3 SHEETS—SHEET 2.

Inventor.
Isaac P. Smith
Atty.

I. P. SMITH.
MEASURING MACHINE.
APPLICATION FILED MAY 12, 1917.

1,330,918.

Patented Feb. 17, 1920.
3 SHEETS—SHEET 3.

Inventor:
Isaac P. Smith.

UNITED STATES PATENT OFFICE.

ISAAC P. SMITH, OF LOWPOINT, ILLINOIS, ASSIGNOR TO THE SELF CLOSING GATE COMPANY, OF LOWPOINT, ILLINOIS, A CORPORATION.

MEASURING-MACHINE.

1,330,918.  Specification of Letters Patent.  Patented Feb. 17, 1920.

Application filed May 12, 1917. Serial No. 168,129.

*To all whom it may concern:*

Be it known that I, ISAAC P. SMITH, a citizen of the United States, and a resident of Lowpoint, in the county of Woodford and State of Illinois, have invented certain new and useful Improvements in Measuring-Machines, of which the following is a full, clear, and exact description, reference being had to the accompanying drawings, forming part of this specification.

My invention relates to machines primarily intended for the measuring of fluids, the measuring being accomplished by means of a counterpoise.

One object of my invention is the provision of means whereby the operation of the machine will be continuous.

Another object is the provision of means whereby the substance passing through the machine will be accurately measured and a record made of the number of units of measure which have passed through the machine.

Another object of my invention is the provision of means whereby fractions of a unit of measure may be determined.

Another object is the provision of means whereby when a given quantity of substance has been passed through the machine, the remaining fractional amount of a unit of measure of the substance may be returned to the main reservoir.

Another object is the provision of means whereby when liquids are handled by the machine, pressure may be used to deliver the liquids to the machine and this pressure automatically cut off or released when the machine is not in operation.

Another object of my invention is the provision of means whereby a signal may be displayed to the operator indicating that the machine is empty.

Other objects of my invention will appear and be described throughout the specification.

The novelty of my invention will be hereinafter more fully set forth and specifically pointed out in the claims.

In the accompanying drawing:—

Figure 1, Sheet 1, is a side elevation of a machine embodying my invention, showing the delivery and discharge connections, the operating handles and the registering device.

Fig. 2, Sheet 1, is a side elevation of Fig. 1.

Figure 3:
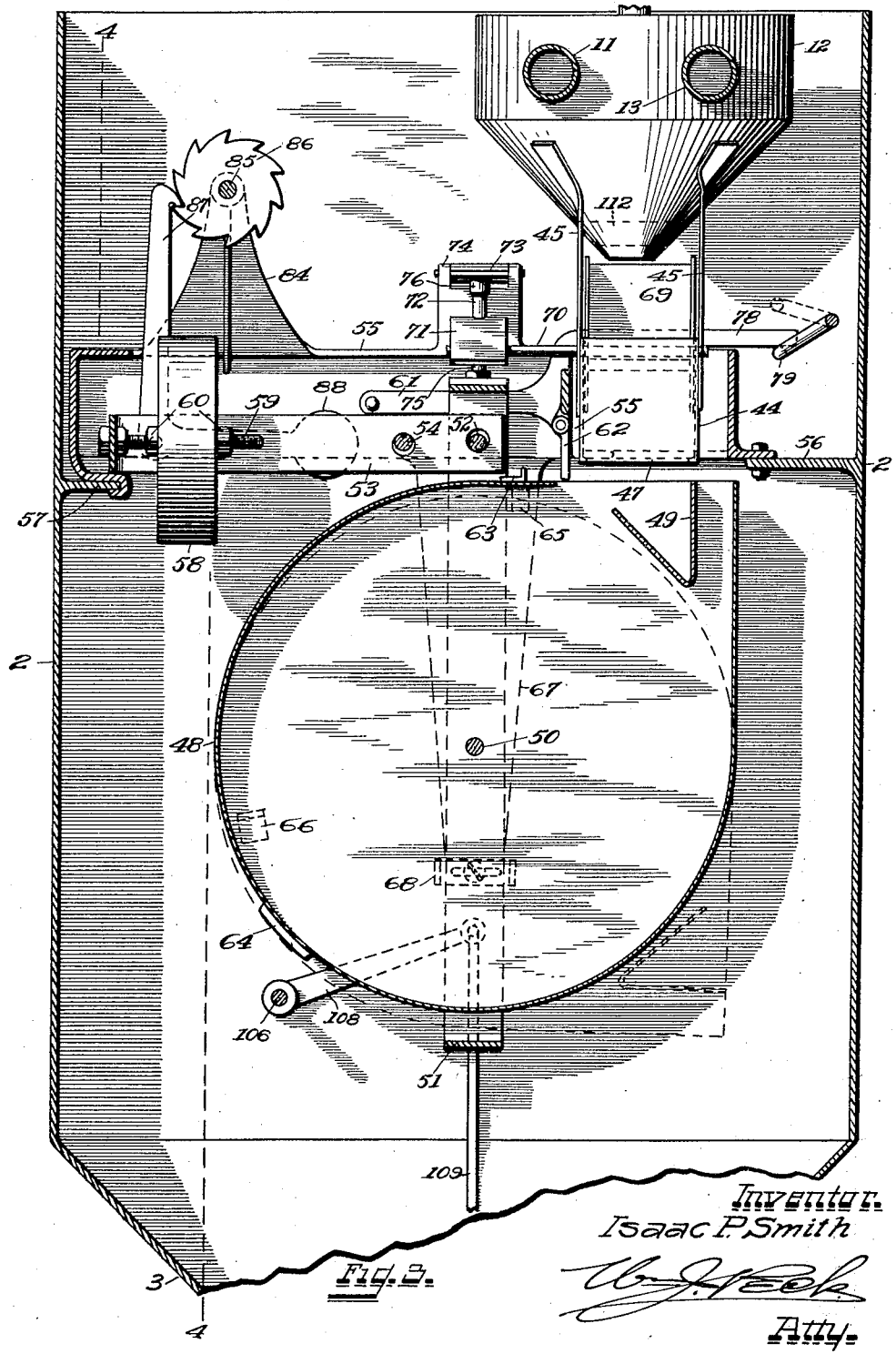

Fig. 3, Sheet 2, is an enlarged sectional elevation, the view being taken in the same position as Fig. 1, but showing the interior mechanism of the machine.

Figure 4:
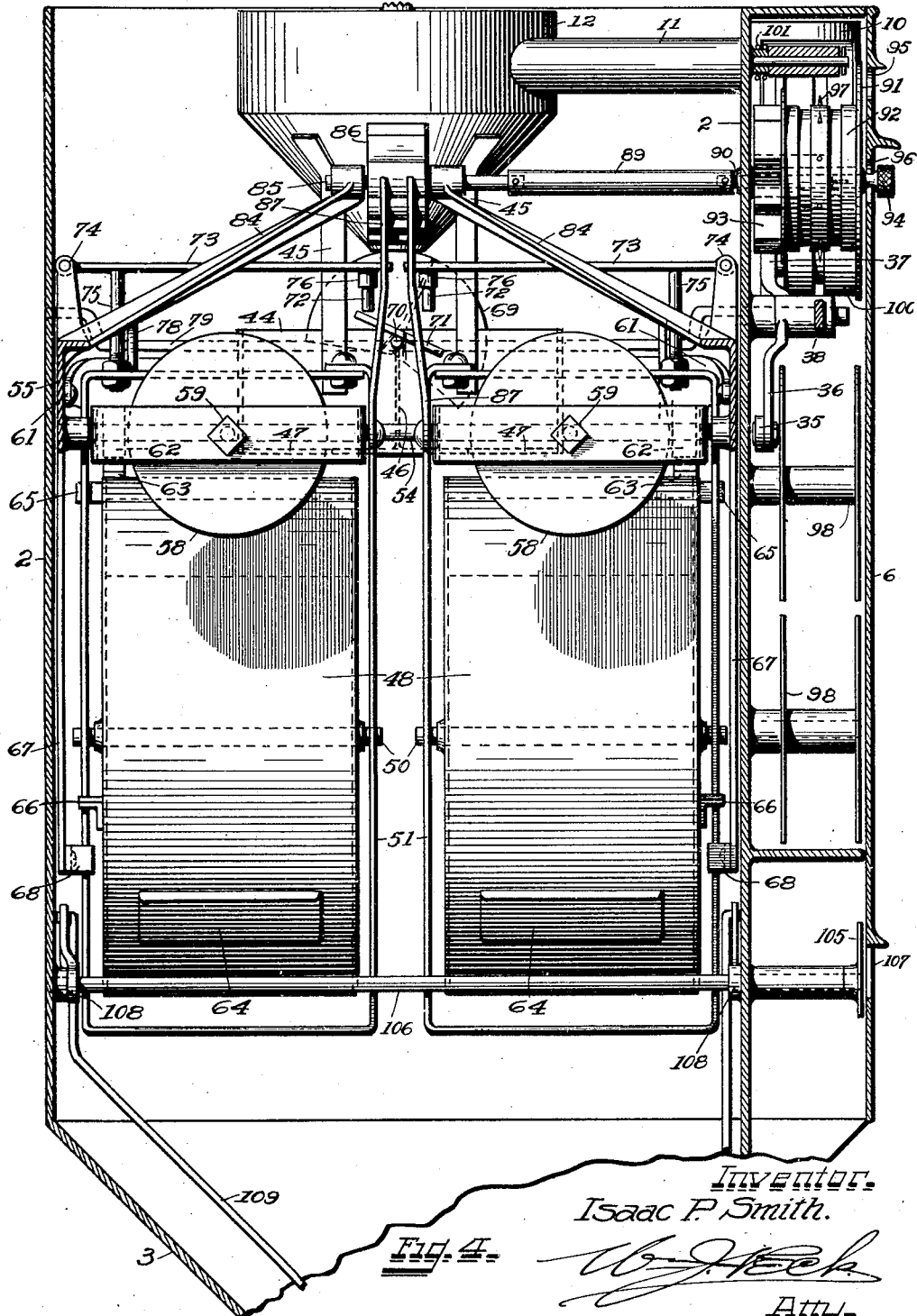

Fig. 4, Sheet 3, is an end elevation partly in section taken on the dotted line 4—4 of Fig. 3.

The same numerals of reference are used to indicate identical parts in all the figures.

For purposes of illustration and to show one form in which my invention may be embodied in a machine, partly adapted to handle gasolene, kerosene, or other similar and hazardous fluids, I have shown a machine consisting of a base 1 upon which is mounted a housing 2, the latter being preferably provided with a hopper bottom 3 and a top or cover 4.

As shown in Figs. 1 and 2, the housing 2 is preferably provided with a pair of doors 5 and 6 which incloses the operating handles and the registering mechanism in such manner that when the doors are closed and locked as by the lock 7, the machine is rendered inoperative, the door 5 closing over the operating handles in such manner that they cannot be moved.

To conduct the fluid into the machine I provide a feed pipe 8 which leads from any suitable source of supply to the feed valve 9 and from thence to the strainer 10 from which the pipe 11 conducts the fluid to the funnel 12 shown in dotted lines Fig. 2 and in solid lines, Figs. 3 and 4.

An over-flow pipe 13 leads from the funnel 12 to the outside of the housing 2 adjacent the inlet pipe 11 and thence downward to the T 14 which is connected to the three-way outlet valve 15 to be later described. From the T 14 the over-flow pipe 13 assumes the added function of a drainage connection as shown at 16 comprising in part the check valve 17 and leading to an auxiliary compartment 18 formed in the base 1.

The auxiliary compartment 18 is provided with an outlet 19 and a shut-off valve 20 from which the connection 21 leads to the storage tank which is preferably placed under-ground, the machine itself being placed above the surface of the ground.

In order to raise the fluid from the under-ground storage tank to the machine, air pressure may be employed and may be conducted through the pipe 22 to the valve 23 and thence through the pipe 24 to the under-ground storage tank to force the contents up through the pipe 8 as previously described.

The valve 9 is provided with an extended operating stem 25 which latter is provided with a handle 26 by means of which it may be operated.

The valve 15 is provided with an upwardly extending operating stem 27 which carries an operating handle 28, the latter lying adjacent to the handle 26 previously described.

The valve 15 also carries a downwardly projecting stem 29 which operates the valve 20.

One side of the valve 15 is connected as at 30 to the discharge from the hopper 3 of the housing 2, while the opposite side of the valve 15 is provided with the outlet 31 shut-off valve 32 and discharge nozzle 33.

The three-way valve 15 is always open from the connection 30 either to the outlet 31 or to the drainage connection 16 previously described, the relative position of the valve 20 with relation to the three-way valve 15 being such that when the three-way valve 15 is open to the drainage connection 16, the valve 20 is closed and when the valve 15 is open to the outlet 31, the valve 20 is open, the object of this arrangement being described later.

The valve operating stem 25 is provided with a flanged pinion 34 and a rack 35 meshes therewith and extends to and is connected to a crank arm 36, the latter operating the locking dog 37 and being provided with a third arm 38 to which the knife 39 is connected, the knife 39 and locking dog 37 being described in detail later herein.

A pin 40 carried by the rack 35 engages the lever 41 of the valve 23 in such manner that when the handle 26 is operated, the valve 23 is opened or closed, the relative setting of these parts being such that when the handle 26 is in the position shown in Fig. 1, the valve 23 is closed to prevent the passage of any compressed air from the pipe 22, the valve 23 being in some instances a three-way valve in which, when the position of the handle 26 is as shown in Fig. 1, the valve 23 opens the passage of the pipe 24 to the atmosphere while closing the outlet from the pipe 22, thereby reducing the pressure in the under-ground storage tank to that of the atmosphere.

It will be observed that the handle 26 is provided with a depending lug 42 which lies behind an upstanding lug 43 on the handle 28 so that as the handle 26 is moved from the position shown in Fig. 1 to open the valve 9, the lug 42, by its contact with the lug 43, operates the handle 28 thereby operating the three-way valve 15 and the valve 20 previously described.

When the proper amount of fluid has passed through the machine, as indicated by the registering mechanism to be presently described, the handle 26 is moved back to the position shown in Fig. 1 thereby closing the feed valve 9, the handle 28 remaining in its open position until the machine has been emptied, whereupon the handle 28 is moved to the position shown in Fig. 1 thereby operating the valves 15 and 20.

Referring more particularly to Figs. 3 and 4, the mechanism by which the fluid is measured will now be described.

The funnel 12 supports a delivery receptacle 44, through the medium of the supports 45, the delivery receptacle 44 being provided with a central partition 46, Fig. 4, by means of which the receptacle is divided into two portions each being provided with an outlet 47. Each of the discharge openings 47 is located above a rotating measuring vessel 48, there being preferably two of such, and arranged side by side as shown in Fig. 4, the vessels being shaped as shown in Fig. 3, and each provided with a cup 49 for tilting the same which is located directly under the discharge opening 47 of the receptacle 44 so that the fluid entering the vessel 48 first fills the cup 49 and then overflows into the vessel to fill it to the proper point.

The vessels 48 are provided with trunnions 50 which are mounted in yokes 51, the latter being hung on knife edges 52 passing through the short ends of the scale beams 53. The scale beams 53 are supported on knife edges 54 which are mounted in the mechanism frame 55 which latter is suitably secured in the interior of the housing 2 as by the supports 56 and 57, Fig. 3.

Each of the scale beams 53 is provided with a balance-weight 58 which may be adjustably mounted on a screw 59 and held in proper position by the lock nuts 60.

A yoke 61 is mounted on the frame 55 and carries a pair of pawls 62 which lie in the path of travel of stops 63 carried by the vessels 48, the position of the parts in Fig. 3 being proper when the vessel 48 is empty. A counter-weight 64 is secured to each vessel 48 and so located as to cause the vessel to assume the position shown in Fig. 3, a stop 65 which is secured to the side of the vessel 48 and contacts with the yoke 51 limiting the movement of the vessel 48 in one direction while a similar stop 66 is carried by each of the vessels 48 to limit its movement in the opposite direction.

The frame 55 is provided with a pair of downwardly projecting portions 67 which carry guides 68 laterally adjustable with relation thereto, the guides 68 serving as means to limit the swing of the yokes 51 as will be readily understood.

A cut-off 69 is carried by the receptacle 44, the cut-off 69 being mounted on a shaft 70 which is provided with a pad 71, the latter occupying a position directly below the pins 72 which are carried by the bars 73 the latter being pivotally mounted as at 74 on the upwardly projecting portions of the frame 55.

Each of the yokes 51 carries an upwardly projecting pin 75 which supports one of the bars 73 in proper position as shown in Fig. 4, the pin 75 being preferably adjustable with relation to the yokes 51 so that the position of the bars 73 with relation to the pad 71 may be adjusted to secure the proper operation of the cut-off 69.

If desired the pins 72 may be of fiber or similar material and may be secured to the bars 73 by means of the sockets 76, while the pins 75 may either be secured to the yokes 51 as shown, or may be mounted between these parts in any other suitable manner.

The yoke 61 which carries the pawls extends over and beyond the frame 55 as shown at 78 and occupies a position immediately above a crank shaft 79 which is carried in the housing 2 and projects through the side thereof and is provided with a crank 80 as shown in Fig. 1, from which a connecting rod 81 extends to the quadrant 82 which is operated by the pinion 83 on the valve stem 27, the arrangement of the parts just described being such that when the handle 28 is operated from its open to its closed position, the crank shaft 79 is moved from the position shown in full lines to that shown in dotted lines in Fig. 3 thereby raising the pawls 62 and permitting the vessels 48 to tilt and discharge any fluid it may contain.

The frame 55 is provided with a pair of upwardly extending and converging members 84 which support a shaft 85 on which a ratchet wheel 86 is mounted, and each of the scale beams 53 carries a pawl 87 which is shaped as shown in Fig. 3 and provided with a counter-weight 88 so arranged that the pawl 87 always occupies a position in contact with the ratchet wheel 86, the construction and arrangement of these parts being such that as either of the scale beams 53 is operated, the ratchet wheel 86 is moved one tooth.

A connection 89 extends from the shaft 85 to a shaft 90 which is carried in the housing 2 and which carries and operates the registering and recording mechanism to be now described.

The registering mechanism comprises an indicating dial 91, a strip feed wheel 92, and a ratchet 93. The indicating dial 91 is provided with a thumb nut 94 and is mounted on the strip feed wheel 92 in such manner that the dial may be reset at any time, its connection to the strip feed wheel being merely frictional, the door 6 being provided with an aperture 95 through which the dial may be read and a second aperture 96 through which the thumb nut 94 projects so that the dial may be reset without opening the door 6. The strip feed wheel 92 is provided with a series of perforating pins 97, the number of these pins corresponding with the number of teeth in the ratchet 86, the pins 97 being adapted to perforate a strip of paper, each perforation representing one unit of measure according to the size of the machine. It will thus be apparent that if the vessels 48 hold one gallon, each perforation in the paper strip will represent one gallon of fluid handled by the machine. In its preferred form of construction the machine is provided with two spools 98 as shown in Fig. 1, each spool supplying a web or strip of paper to the registering and recording mechanism, the object being that the operator of the machine retains one of the strips while the customer receives the other.

The strips of paper 99 pass from the spool 98 and are held against the perforating wheel 92 by pressure rollers 100, Fig. 1, which are mounted adjacent to the perforating wheel 92 and held in contact therewith by the springs 101, Fig. 4, so that the strips of paper are at all times pressed firmly against the perforating wheel 92. A delivery spout 102 is mounted on the housing 2 and adjacent to the perforating wheel 92 in such manner that the strips of paper pass from the perforating wheel 92 through the spout 102 and into the delivery spout 103, as shown in dotted lines in Fig. 1, from which they are removed by the operator and properly distributed.

The strips of paper pass through a perforation in the knife 39 which is connected through the linkage previously described to the valve stem 25, the construction and arrangement of the parts being such that when the handle 26 is moved from the position shown in Fig. 1, the knife 39 is raised, thus exposing the aperture therein so that the strips of paper may pass through the knife 39 and into the spout 103. When the handle 26 is moved back to the position shown in Fig. 1, the knife 39 is drawn downward to cut off the strips of paper as will be readily understood.

The ratchet 93 is engaged by the locking dog 37 when the parts are in the position shown in Fig. 1, in which condition the feed wheel 92 is locked against operation, though when the handle 26 is operated to open the feed valve 9, the pinion 34 operates the rack 35 and through its connections, retracts the dog 37 out of engagement with the ratchet 93 thereby permitting the registering mechanism to be operated by the ratchet 86 and pawls 87 previously described.

If desired a total adder 104, shown diagrammatically in Fig. 1, may be mounted on the housing 2 and operated by the ratchet 93 so that as the mechanism is operated, the total number of units of measure drawn from the machine will be recorded on the total adder 104 as well as on the paper strip which has been previously described.

To indicate to the operator that the machine is in condition for the closing of the handle 28, after the handle 26 has been moved to closed position, a target 105 is mounted on the end of a rock shaft 106, Figs. 1, 3 and 4, the target 105 being adapted to be read through an aperture 107 in the door 6. The shaft 106 is provided with a pair of crank arms 108 to which a bail 109 is attached. The bail 109 carries a cup 110, dotted lines Fig. 1, the cup 110 being provided with a small perforation in the bottom thereof, the cup being so positioned inside the housing 2 that the fluid discharged from the vessels 48 fills the cup 110 thereby moving the target 105 away from its position behind the aperture 107 until such time as the fluid in the cup 110 has drained out therefrom, whereupon the target will again appear behind the aperture 107.

As shown in Figs. 1 and 2, a gage 111 is provided for the purpose of determining fractions of the units of measure of the vessels 48, after such fractions have been drained from the vessels and before such fractions are either drained into the auxiliary compartment 18 or through the valve 32.

The operation of the device is as follows:—

Assuming that the parts of the device are in the position shown in the drawings and it is desired to operate the machine, the handle 26 is moved from the position shown in Fig. 1 to open the feed valve 9, the handle 26 moving the handle 28 through the medium of the lugs 42 and 43 thereby operating the valve 15 and opening the valve 20. In addition, the crank shaft 79 is brought into the position shown in Fig. 3, the valve 23 is opened to permit a flow of air from the pipe 22 to the pipe 24, the dog 37 is moved away from the registering mechanism, and the knife 39 is raised to permit the feed of the paper strip. The liquid to be measured enters the machine through the pipe 8, valve 9, strainer 10, connection 11, and funnel 12, and if the cut-off is in the position shown in Fig. 4, flows into the left-hand side of the receptacle 44 and into the left-hand vessel 48 until a sufficient amount of the liquid has entered the vessel to overbalance the weight 58 whereupon the vessel 48 moves downward thereby moving the stops 63 below the lower end of the pawl 62 and permitting the liquid in the tilting cup 49 to become effective to partially rotate the vessel 48. The first part of the downward movement of the vessel 48 causes the operation of the left-hand bar 73 thereby causing its pin 72 to strike the pad 71 and operate the cut-off to direct the stream of liquid into the right hand compartment of the receptacle 44 whereupon the right hand vessel becomes filled with liquid and upon receiving a quantity sufficient to overbalance the weight 58, this vessel moves downward thereby discharging its contents and tripping the cut-off again to the position shown in Fig. 4.

At each operation of either of the vessels 48, the pawl 87 which is carried by the scale beam 53 of that vessel is raised, thereby bringing it into engagement with the next following tooth of the ratchet 86 and after the vessel 48 has been emptied, the weight 58 becomes effective to return the vessel to its proper position and to operate the registering mechanism.

At each operation of either of the vessels 48, one unit is added to the display of the dial 91, one perforation is made in the paper strip, and one is added to the total of the adder 104.

When the required number of units of measure have been discharged from the vessels 48, the operator moves the handle 26 back to the position shown in Fig. 1, thereby closing the feed valve 9, shutting off the air, cutting off the paper strip, and locking the registering mechanism.

During the time of operation of the machine the discharges from the vessels 48 are sufficiently close together so that the cup 110 is kept constantly filled with fluid thereby holding the target 105 away from its position in front of the aperture 107, though after the operator has moved the handle 26 thereby cutting off the entrance of liquid into the machine, the cup 110 begins to drain as the fluid drains from the machine, and at the time all of the fluid has passed from the machine, the cup 110 has drained itself, thereby permitting the weight of the target to become effective to return the latter to the position shown in Fig. 1, thereby displaying to the operator that the handle 28 may be turned to closed position as the container has received the proper number of units of measure of the machine.

Operating the handle 28 to closed position closes the valve 20 and operates the valve 15 so that any liquid passing out through the connection 30 passes into the overflow pipe 13 from which it is delivered to the auxiliary compartment 18 through the connections previously described, the operation of the handle 28 also operating the crank shaft 79 previously described and raising both of the pawls 62 thereby permitting the vessels 48 to discharge whatever amount of liquid may have been permitted to flow into the machine after the registering of the last unit of measure before the handle 26 was moved to closed position, and this fluid passes out through the connections 30, valve 15, connections 16, and into auxiliary compartment 18, where it remains until the next time the machine is used, whereupon, upon the opening of the valve 20 during the next operation of the machine, the contents of the auxiliary compartment 18 flows by gravity into the under-ground storage tank, the check valve 17 preventing any back flow due to air pressure in the under-ground tank.

To maintain an even and steady flow into the measuring portion of the machine, the funnel 12 is employed, the feed pipe 11 entering this funnel at a point out of line with the center thereof so as to cause the substance to be measured to rotate in the funnel 12 and substantially fill the same, and to stop the rotation of the stream of substance, a bridge wall 112 may be mounted in the lower portion of the funnel 12 as shown in Fig. 3 to the end that the stream of substance on leaving the funnel will not distribute itself in the form of spray but will drop in a solid stream into the cup 44 and be delivered to one or the other of the vessels 48.

It is to be further observed that the tilting-cup 49 is so positioned in the vessel 48 that when the latter is in discharging position as shown by the dotted lines of Fig. 3, the inclined surface of the tilting-cup 49 is presented to the outgoing stream of contents in such manner that the cup 49 assists in maintaining the vessel 48 in its tilted position until the complete discharge of the contents is accomplished as will be readily apparent.

Having thus fully described my invention, I claim:—

1. In a measuring machine, the combination of a tilting measuring vessel, a tilting-cup carried thereby and adapted to receive the substance to be measured and to overflow and fill the vessel, and means for operatively mounting said vessel.

2. In a measuring machine, the combination of a tilting measuring vessel, a tilting-cup carried thereby and adapted to receive the substance to be measured and to overflow and fill the vessel, and means whereby when said vessel has received the proper amount of the substance being measured the vessel is released so that the contents of said tilting-cup causes said vessel to tilt and discharge its contents as well as the contents of the cup.

3. In a measuring machine, the combination of a tilting vessel, a tilting-cup carried thereby, movable supporting means for said vessel, means for holding said vessel in receiving position until the operation of said movable supporting means, and means for rendering said holding means inoperative to permit the discharge of less than a full measure of contents of said vessel.

4. In a measuring machine, the combination of a tilting vessel, a tilting-cup carried thereby and positioned to be filled by the substance to be measured as it enters said vessel, movable supporting means for said vessel, means for normally holding said vessel in receiving position until the operation of said supporting means, and a counting mechanism operated by said movable supporting means.

5. In a measuring machine, the combination of a tilting vessel, a tilting-cup carried thereby and positioned to be filled by the substance to be measured as it enters said vessel, movable means for supporting said vessel, means for normally holding said vessel in receiving position until the operation of said supporting means, means for rendering said holding means inoperative whereby less than a full measure of contents of said vessel may be discharged, and a counting mechanism operated by said movable supporting means.

6. In a measuring machine, the combination of a tilting vessel, a tilting-cup carried thereby and positioned to be filled by the substance to be measured as it enters said vessel, a scale beam for supporting said vessel, a counter-weight on said beam, a stop on said vessel, a pawl normally occupying a position in the path of travel of said stop whereby said vessel is prevented from tilting until said scale beam is operated, and means for moving said pawl out of the path of travel of said stop whereby less than a full measure of contents may be discharged from said vessel.

7. In a measuring machine, the combination of a tilting vessel, a tilting-cup carried thereby and positioned to be filled by the substance to be measured as it enters said vessel, a scale beam for supporting said vessel, a counter-weight on said scale beam, a stop on said vessel, a pawl normally occupying a position in the path of travel of said stop whereby said vessel is maintained in a receiving position, means for moving said pawl out of the path of travel of said stop whereby less than a full measure of contents may be discharged from said vessel, and a counting mechanism operated by the movement of said scale beam.

8. In a measuring machine, the combination of a tilting vessel, a tilting-cup carried thereby, a supporting member for said vessel, a scale beam to which said supporting member is attached, a guide for said supporting member, movement limits carried by said vessel and coacting with said supporting member, a stop carried by said vessel, and a pawl normally occupying a position in the path of travel of said stop for maintaining said vessel in receiving position.

9. In a measuring machine, the combination of a tilting vessel, a tilting-cup carried thereby, a supporting member for said vessel, a scale beam to which said supporting member is attached, a guide for said supporting member, movement limits carried by said vessel and coacting with said supporting member, a stop carried by said vessel, a pawl normally occupying a position in the path of travel of said stop for maintaining said vessel in receiving position, and means for moving said pawl out of the path of travel of said stop whereby less than a full measure of contents may be discharged from said vessel.

10. In a measuring machine, the combination of a tilting vessel, a tilting-cup carried thereby, a supporting member for said vessel, a scale beam to which said supporting member is attached, a guide for said supporting member, movement limits carried by said vessel and coacting with said supporting member, a stop carried by said vessel, a pawl normally occupying a position in the path of travel of said stop for maintaining said vessel in receiving position, means for moving said pawl out of the path of travel of said stop whereby less than a full measure of contents may be discharged from said vessel, and a counting mechanism operated by the movement of said scale beam for counting the complete operations of the device.

11. In a measuring machine, the combination of a pair of tilting measuring vessels, a tilting-cup carried by each vessel, a constant flow feed device for filling said tilting-cup and said vessels, means for operatively supporting said vessels, and a cut-off controlled in its position by the movement of either of said vessels whereby the flow from said feeding device is directed alternately into one or the other of said vessels.

12. In a measuring machine, the combination of a pair of tilting measuring vessels, a tilting-cup carried by each vessel, a constant flow feeding device for said vessels, means for operatively supporting said vessels, a cut-off controlled in its position by the movement of either of said vessels and for alternately directing the flow from said feeding device into one or the other of said vessels, and means for maintaining said vessels in receiving position until the proper quantity of substance has been fed thereinto.

13. In a measuring machine, the combination of a pair of tilting measuring vessels, a tilting-cup carried by each vessel, a constant flow feeding device for said vessels, means for operatively supporting said vessels, a cut-off controlled in its position by the movement of either of said vessels and for alternately directing the flow from said feeding device into one or the other of said vessels, and means for releasing said vessels alternately when they have received the proper amount of substance.

14. In a measuring machine, the combination of a pair of tilting measuring vessels, a tilting-cup carried by each vessel, a constant flow feeding device for said vessels, means for operatively supporting said vessels, a cut-off controlled in its position by the movement of either of said vessels and for alternately directing the flow from said feeding device into one or the other of said vessels, means for maintaining said vessels in receiving position until the proper quantity of substance has been fed thereinto, and means for releasing said vessels alternately when they have received the proper amount of substance.

15. In a measuring machine, the combination of a pair of tilting measuring vessels, a tilting-cup carried by each vessel, a constant flow feeding device for said vessels, means for operatively supporting said vessels, a cut-off controlled in its position by the movement of either of said vessels and for alternately directing the flow from said feeding device into one or the other of said vessels, means for maintaining said vessels in receiving position until the proper quantity of substance has been fed thereinto, means for releasing said vessels alternately when they have received the proper amount of substance, and means for rendering said releasing means inoperative whereby less than a full measure of substance may be discharged from said vessels.

16. In a measuring machine, the combination of a pair of tilting measuring vessels, a tilting-cup carried by each vessel, a constant flow feeding device for said vessels, means for operatively supporting said vessels, a cut-off controlled in its position by the movement of either of said vessels and for alternately directing the flow from said feeding device into one or the other of said vessels, means for maintaining said vessels in receiving position until the proper quantity of substance has been fed thereinto, means for releasing said vessels alternately when they have received the proper amount of substance, and counting mechanism operated by the movement of either of said vessels.

17. In a measuring machine, the combination of a pair of tilting measuring vessels, a tilting-cup carried by each vessel, a constant flow feeding device for said vessels, means for operatively supporting said vessels, a cut-off controlled in its position by the movement of either of said vessels and for alternately directing the flow from said feeding device into one or the other of said vessels, means for maintaining said vessels in receiving position until the proper quantity of substance has been fed thereinto, means for releasing said vessels alternately when they have received the proper amount of substance, means for rendering said releasing means inoperative whereby less than a full measure of substance may be discharged from said vessels, and counting mechanism operated by the movement of either of said vessels.

18. In a measuring machine, the combination of a base, a housing mounted thereon for containing the measuring mechanism, a fluid conduit leading to the upper portion of said housing, a feed valve in said conduit, a feed funnel connected to said conduit at the end thereof, an overflow conduit leading from said funnel, a discharge outlet leading from the lower portion of said housing, a three-way valve in said discharge conduit and connected to said overflow conduit, means whereby when said feed valve is opened said three-way valve is opened to said discharge conduit, and means whereby said three-way valve can be opened to said overflow conduit only after said feed valve has been closed.

19. In a measuring machine, the combination of a housing for containing measuring mechanism, measuring mechanism mounted therein, a compartment formed on one side of said housing for containing operating devices for said machine, a door over said compartment, operating devices comprising in part a handle and mounted within said compartment said operating devices being so located that they must be moved to closed position before said door can be closed.

20. In a measuring machine, the combination of a housing for containing measuring mechanism, measuring mechanism mounted in said housing, a registering device operated by said measuring mechanism, a feed valve for controlling the flow of substance into said machine, means for operating said valve, and means whereby when said feed valve is closed said registering device is locked against operation.

21. In a measuring machine, the combination of a housing for containing measuring mechanism, measuring mechanism mounted in said housing, a feed valve for controlling the flow of substance into said measuring mechanism, means for operating said valve, a registering device operated by said measuring mechanism and for issuing a strip on which said registrations are indicated, a knife for cutting off the strip issued by said registering mechanism, and means whereby when said feed valve is closed said knife is operated to cut off the strip.

22. In a measuring machine, the combination of a housing for containing measuring mechanism, measuring mechanism mounted in said housing, a feed valve for controlling the flow of substance into said measuring mechanism, means for operating said valve, a registering device operated by said measuring mechanism and for issuing a strip on which said registrations are indicated, a knife for cutting off the strip issued by said registering mechanism, means whereby when said feed valve is closed said knife is operated to cut off the strip, and means whereby when said feed valve is closed said registering device is locked against operation.

23. In a measuring machine, the combination of a housing for containing measuring mechanism, measuring mechanism mounted in said housing, means for introducing substance into said measuring mechanism, and an indicator operated by the discharge of the substance from the measuring mechanism and for indicating to the operator that all of the substance which has been measured has been discharged from the machine.

24. In a measuring machine, the combination of a housing for containing measuring mechanism, measuring mechanism mounted in said housing, means for delivering substance to said measuring mechanism, a discharge connection from said machine, a cut-off valve in said discharge connection, and a gage in communication with the discharge portion of the machine whereby fractions of the unit of measure may be determined.

25. In a measuring machine, the combination of a housing for containing measuring mechanism, measuring mechanism mounted in said housing, a feed valve for controlling the flow of substance into said measuring mechanism, a fluid pressure line for causing the delivery of substance to said feed valve, a valve in said fluid pressure line, means for operating said feed valve, and connections between said operating means and said valve in said fluid pressure line whereby when said feed valve is closed said second valve is closed.

26. In a measuring machine, the combination of a housing for containing measuring mechanism, measuring mechanism mounted in said housing and comprising in part tilting measuring vessels, a feed valve for controlling the flow of substance into said measuring mechanism, a drainage valve for controlling the flow of substance from the discharge of said machine into an overflow connection, an overflow connection, and means whereby when said drainage valve is operated to overflow position said measuring mechanism will be operated to discharge its contents into said overflow connection.

27. In a measuring machine, the combination of a housing for containing measuring mechanism, measuring mechanism mounted in said housing, a feed valve for controlling the delivery of substance to said measuring mechanism, means for operating said feed valve, a fluid pressure line for causing the delivery of substance to said feed valve, a pressure cut-off valve in said line, a drainage valve in connection with the discharge from said machine and an overflow connection, an overflow connection leading from said drainage valve to an auxiliary receptacle and provided with a check valve, an auxiliary receptacle provided with an outlet connection, an outlet valve in the connection with said auxiliary receptacle, connections between said outlet valve and said drainage valve whereby when said drainage valve is open to the overflow connection said outlet valve will be closed, and connections between said feed valve operating mechanism and said valve in said fluid pressure line whereby when said feed valve is closed said pressure line valve is closed.

28. In a measuring machine, the combination of a housing for measuring mechanism, measuring mechanism mounted therein, a feed valve for delivery of substance to said mechanism, a registering mechanism operated by the operation of said measuring mechanism, a fluid pressure line for causing the delivery of substance to said feed valve, a shut-off valve in said line, means for operating said feed valve, connections between said operating means and said fluid pressure shut-off valve and said registering mechanism whereby when said feed valve is closed said shut-off valve is closed and said registering mechanism is locked against operation, a discharge connection from said machine, a drainage and overflow valve in said connection, means for operating said drainage and overflow valve, a cut-off valve in said discharge connection, means whereby when said feed valve is opened said drainage and overflow valve will be open to drainage position, and a gage whereby when said feed valve has been closed said cut-off valve in said discharge connection may be closed and fractions of a unit of measure of the machine determined.

ISAAC P. SMITH.